No. 855,587. PATENTED JUNE 4, 1907.
L. PEDERSON.
LAWN MOWER.
APPLICATION FILED FEB. 17, 1906.
2 SHEETS—SHEET 1.
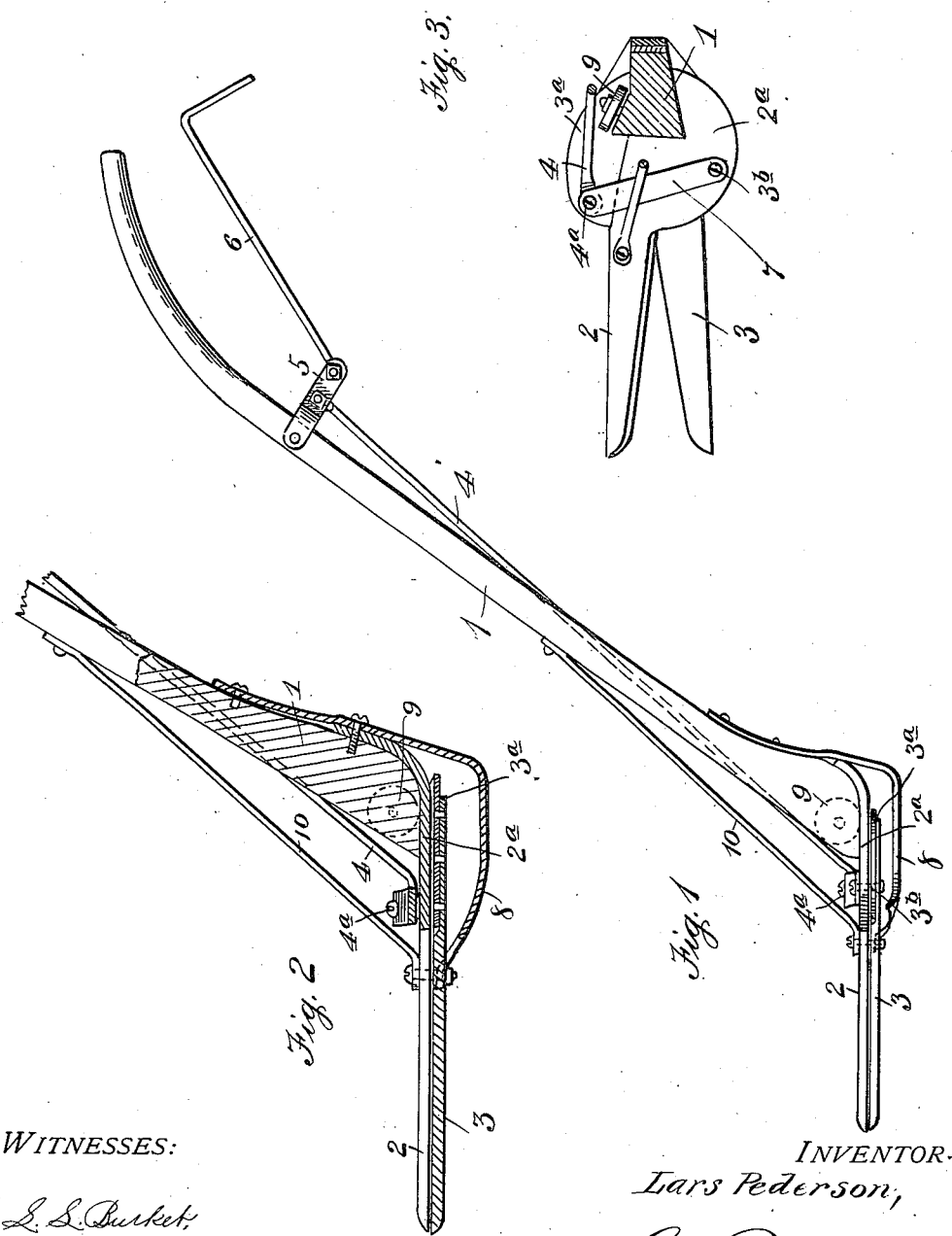
WITNESSES:
INVENTOR:
Lars Pederson,
BY
Attorneys

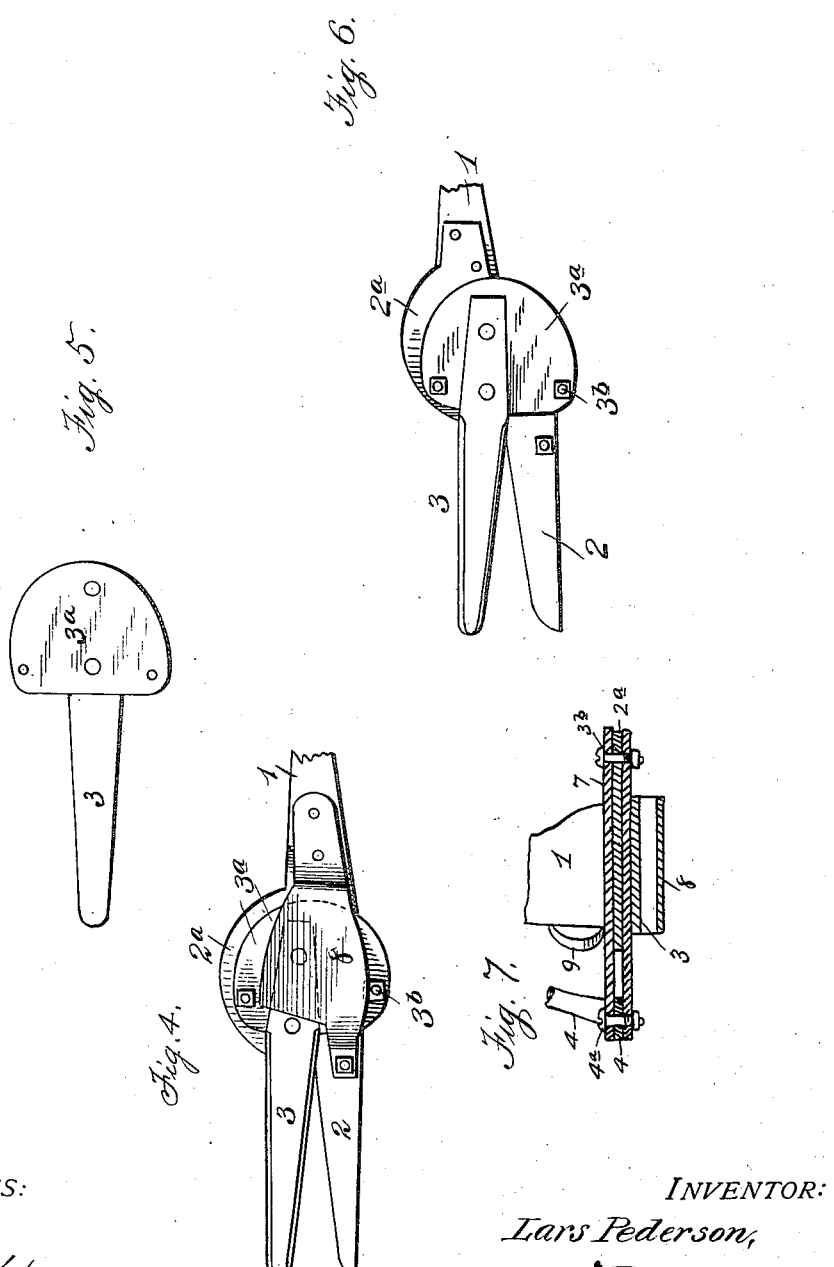

UNITED STATES PATENT OFFICE.

LARS PEDERSON, OF MANITOWOC, WISCONSIN.

LAWN-MOWER.

No. 855,587.

Specification of Letters Patent.

Patented June 4, 1907.

Application filed February 17, 1906. Serial No. 301,649.

*To all whom it may concern:*

Be it known that I, LARS PEDERSON, a citizen of the United States, residing at Manitowoc, in the county of Manitowoc and State of Wisconsin, have invented certain new and useful Improvements in Lawn-Mowers, of which the following is a specification.

My invention relates to improvements in what may be termed lawn mowers, being particularly designed for mowing or cutting grass. Its object is to accomplish this in an effective and convenient manner at the minimum expense and labor.

Said invention therefore consists of the structural features substantially as hereinafter fully disclosed and specifically pointed out by the claims.

In the accompanying drawing illustrating the preferred embodiment of my invention—Figure 1 is a side elevation, and Fig. 2 is a broken sectional elevation thereof. Fig. 3 is a plan view of the same, also with certain parts shown partially broken away. Fig. 4 is an inverted view, with parts partially broken off. Fig. 5 is a detached view of the movable blade or cutter. Fig. 6 is a full view taken from the underside so far as relates to the cutting apparatus. Fig. 7 is an enlarged detailed view showing more fully the pivotal connection 4ª between the rod 4 and the blade 3.

In carrying out my invention, I suitably fix or rigidly secure to the lower end of a handle-bar 1, and upon its underside so that it shall have about the inclination indicated, a blade or cutter 2, preferably terminated at its inner end in a lateral plate-like extension or enlargement 2ª, with its inner or tang portion bent or conformed to the preferably curved or rounded surface or heel-portion of said end of said handle-bar. A second or companion blade or cutter 3 is arranged or adapted to co-operate with the aforesaid blade or cutter after the fashion of the blades of ordinary shears, it having fixed thereto, upon its upper surface, at the heel-end, a plate-like piece or member 3ª practically forming an integral portion of said blade or cutter and which is pivoted at one of its forward corner-edges, as at 3ᵇ, to the lateral plate-like extension 2ª of the fixed or stationary blade, about midway of that edge of said extension thus providing for the pivotal action of said blade as presently seen.

The heel-plate or member 3ª of the pivoted blade or cutter 3 has connected thereto, near its opposite edge directly in alinement with the pivotal point of said blade as at 4ª a pitman or rod 4 in turn connected, at its upper end, to a lever 5 fulcrumed upon the handle-bar 1 intermediately of the ends of the latter. An additional rod or lever 6 is connected to the aforesaid lever and adapted to be manually actuated while the machine is being pushed from said handle-bar, as in performing the mowing or cutting operation. It will be noted that in actuating the aforesaid parts they have a cam or eccentric action and that the pivoted or movable blade or cutter is caused to co-operate with the stationary blade 2 and thus provide for a shear-action between said blades in effecting the cutting or mowing operation. The pivoting screw-bolts 3ᵇ and 4ª of the movable or pivoted cutter or blade and the pitman or rod 4, respectively, are connected together by an inflexible link 7 for steady and positive action between the blades and for stability and the bracing of the parts noted.

A "shoe" 8, in the form of a plate or shield, suitably bolted or secured preferably to the stationary blade or cutter 2, upon its underside, and to the rear-side of the handle-bar 1, is offset from the lower side of the heel portions of the blades and their adjunctive parts, to provide for isolating or removing the same from contact with the ground surface, the purpose of which is obvious. Also, it is obvious that in lieu of mounting said parts upon the shoe, wheels may be provided for that purpose.

In order to reduce friction and bring the effective or cutting edges of the blades into a shearing relation, a rotary disk, roll or wheel 9 is suitably journaled or pivoted upon the handle-bar 1, near its lower end, so as to engage and revolve in contact with the upper surface of the heel-plate 3ª of the pivoted blade or cutter 3. Also, the stationary blade or cutter 2 is suitably braced in position, together with the adjunctive parts, by means preferably of a rod or brace 10 suitably secured to the handle-bar 1, at the required point thereon, and to said blade, the securing bolt for the latter connection preferably serving also for effecting the connection between the shoe or shield 8 at its forward end, and the underside of said blade. It is further noted that both the pull exerted upon the blade actuating lever and the pushing action delivered through the handle-member, assist the blades in performing the cutting operation.

I claim:

1. A device of the character described, comprising a handle-equipped member having a fixed blade at its lower end provided with a lateral heel-extension, a second blade having also extensions projecting therefrom, said second blade being pivotally connected to the aforesaid blade by one of its extensions, a pitman or rod connected to the other extension of said pivoted blade, at the side of the line of the cutting action of said blades, and means connected to said handle-equipped member for its convenient actuation.

2. A device of the character described, comprising a handle-member having a fixed blade at its lower end, a movable blade co-operating with the aforesaid blade, each of said blades having an extension projecting from the same side as the extension from the other blade and pivotally connected together, said movable blade also having an extension projecting from its opposite side, a rod or pitman connected to said last named extension at one side of the line of the cutting action of said blades, a link connected to the means forming connection between said blades and between one of said blades and said rod or pitman, and means connected to said rod or pitman for its convenient actuation.

3. A lawn mower, comprising a handle-member provided with a fixed blade equipped with a lateral heel-extension, a movable blade also having a corresponding extension pivoted to the aforesaid extension at one side of the line of the cutting action of said blades, and means for actuating said movable blade, embracing a pitman or rod connected to the heel-end of said movable blade at the opposite side, said handle-member being equipped with a rotary disk or roll adapted to engage the heel-end of said movable blade, and said movable blade actuating means also including a lever fulcrumed upon said handle-member and having connected thereto said pitman, and a hand-lever connected to the aforesaid lever.

In testimony whereof I have signed my name to this specification in the presence of two subscribing witnesses.

LARS PEDERSON.

Witnesses:
C. E. BRADY,
A. L. VAUGHN.